(12) United States Patent
Lan et al.

(10) Patent No.: US 11,503,824 B2
(45) Date of Patent: Nov. 22, 2022

(54) TOUCH SCREEN CLEANING AND PROTECTANT COMPOSITION

(71) Applicant: Microban Products Company, Huntersville, NC (US)

(72) Inventors: Tian Lan, Huntersville, NC (US); Ivan W. Ong, Charlotte, NC (US); Gina Parise Sloan, Statesville, NC (US); Karen Terry Welch, Kannapolis, NC (US)

(73) Assignee: Microban Products Company, Huntersville, NC (US)

( * ) Notice: Subject to any disclaimer, the term of this patent is extended or adjusted under 35 U.S.C. 154(b) by 224 days.

(21) Appl. No.: 15/599,774

(22) Filed: May 19, 2017

(65) Prior Publication Data

US 2017/0332625 A1    Nov. 23, 2017

Related U.S. Application Data

(60) Provisional application No. 62/340,310, filed on May 23, 2016.

(51) Int. Cl.
| | |
|---|---|
| A01N 25/02 | (2006.01) |
| A01N 33/02 | (2006.01) |
| A01N 25/00 | (2006.01) |
| B08B 3/08 | (2006.01) |
| C11D 7/50 | (2006.01) |
| C11D 11/00 | (2006.01) |
| C11D 3/48 | (2006.01) |
| A01N 43/76 | (2006.01) |
| A01N 33/12 | (2006.01) |
| C11D 3/37 | (2006.01) |
| C08G 73/02 | (2006.01) |

(52) U.S. Cl.
CPC ............ *A01N 25/02* (2013.01); *A01N 33/02* (2013.01); *A01N 33/12* (2013.01); *A01N 43/76* (2013.01); *B08B 3/08* (2013.01); *C08G 73/0233* (2013.01); *C11D 3/3719* (2013.01); *C11D 3/48* (2013.01); *C11D 7/50* (2013.01); *C11D 11/0035* (2013.01); *A01N 25/00* (2013.01); *B32B 2255/26* (2013.01)

(58) Field of Classification Search
CPC ........ A01N 25/02; A01N 33/02; A01N 25/00; B08B 3/08; C08G 73/0233; C11D 7/50; B28B 2255/26
USPC ....................................................... 524/458
See application file for complete search history.

(56) References Cited

U.S. PATENT DOCUMENTS

| | | | |
|---|---|---|---|
| 2,897,182 A | * | 7/1959 | De Benneville ...... C08F 220/44 |
| | | | 526/260 |
| 3,481,689 A | | 12/1969 | Rosdahl et al. |
| 3,673,097 A | | 6/1972 | de Vroome |
| 3,997,460 A | | 12/1976 | Sirine et al. |
| 4,144,211 A | | 3/1979 | Chamberlin et al. |
| 4,186,191 A | | 1/1980 | Chamberlin et al. |
| 4,326,977 A | | 4/1982 | Schmolka |
| 4,408,001 A | | 10/1983 | Ginter et al. |
| 4,481,167 A | * | 11/1984 | Ginter .................... A01N 59/00 |
| | | | 422/29 |
| 4,486,246 A | | 12/1984 | Warchol |
| 4,585,482 A | | 4/1986 | Tice et al. |
| 4,601,954 A | | 7/1986 | Coleman |
| 4,719,105 A | | 1/1988 | Schleppnik |
| 4,837,005 A | | 6/1989 | Brode, II et al. |
| 4,912,154 A | | 3/1990 | Arora et al. |
| 4,941,989 A | | 7/1990 | Kramer et al. |
| 4,990,339 A | | 2/1991 | Scholl et al. |
| 4,999,386 A | | 3/1991 | Oakes et al. |
| 5,051,124 A | | 9/1991 | Pera |
| 5,061,485 A | | 10/1991 | Oakes et al. |
| 5,183,601 A | | 2/1993 | Jisai et al. |
| 5,529,713 A | | 6/1996 | Gauthier-Fournier |
| 5,547,990 A | | 8/1996 | Hall et al. |
| 5,645,823 A | | 7/1997 | Thrall et al. |
| 5,654,154 A | | 8/1997 | Bronstein et al. |
| 5,756,145 A | | 5/1998 | Darouiche |
| 5,762,948 A | | 6/1998 | Blackburn et al. |
| 5,776,479 A | | 7/1998 | Pallos et al. |
| 5,849,310 A | | 12/1998 | Trinh et al. |
| 5,929,016 A | | 7/1999 | Harrison |
| 5,932,253 A | | 8/1999 | Trinh et al. |
| 6,080,387 A | | 6/2000 | Zhou et al. |
| 6,106,820 A | | 8/2000 | Morrissey et al. |
| 6,110,387 A | | 8/2000 | Choudhury et al. |
| 6,136,770 A | | 10/2000 | Cheung et al. |
| 6,139,856 A | | 10/2000 | Kaminska et al. |
| 6,159,924 A | | 12/2000 | Weller et al. |

(Continued)

FOREIGN PATENT DOCUMENTS

| | | |
|---|---|---|
| AU | 693463 | 7/1998 |
| AU | 19999054305 A1 | 5/2000 |
| CA | 1081119 | 7/1980 |
| CN | 1129946 A | 8/1996 |
| CN | 1061055 C | 1/2000 |

(Continued)

OTHER PUBLICATIONS

Bardac; http://bio.lonza.com/uploads/tx_mwaxmarketingmaterial/Lonza_ProductDataSheets_Bardac_208M_PDS.pdf) Nov. 29, 2007, pp. 1-2.

(Continued)

*Primary Examiner* — Kelechi C Egwim
(74) *Attorney, Agent, or Firm* — Nelson Mullins Riley & Scarborough LLP

(57) ABSTRACT

A cleaning and protectant composition and a method for using the composition on an article such as a touch screen or screen protector for a mobile device, computer, or other electronic device. The composition comprises a polymeric film former. The polymeric film former is an oxazoline homopolymer or an extended or a modified polymer based on an oxazoline homopolymer. The polymeric film former forms a retention coating to retain components within the composition for an extended period of time. The composition is also present in a kit with an application device.

9 Claims, No Drawings

(56) References Cited

U.S. PATENT DOCUMENTS

| | | | |
|---|---|---|---|
| 6,180,584 B1 | 1/2001 | Sawan et al. | |
| 6,194,075 B1 | 2/2001 | Sargeant et al. | |
| 6,270,754 B1 | 8/2001 | Zhou et al. | |
| 6,294,186 B1 | 9/2001 | Beerse et al. | |
| 6,458,906 B1 | 10/2002 | Torgerson et al. | |
| 6,559,111 B2 | 5/2003 | Colcurclello, Jr. et al. | |
| 6,613,755 B2 | 9/2003 | Peterson et al. | |
| 6,616,922 B2 | 9/2003 | Taylor et al. | |
| 6,645,507 B2 | 11/2003 | Bettle et al. | |
| 6,797,278 B2 | 9/2004 | Jackson et al. | |
| 6,936,580 B2 | 8/2005 | Sherry et al. | |
| 7,304,022 B2 | 12/2007 | Cheung et al. | |
| 7,470,656 B2 | 12/2008 | Sherry et al. | |
| 7,488,757 B2 | 2/2009 | Hoang et al. | |
| 7,704,935 B1 | 4/2010 | Davis et al. | |
| 7,713,955 B2 * | 5/2010 | Whiteford | A01N 43/90 514/183 |
| 7,723,108 B2 | 5/2010 | Truncale et al. | |
| 8,119,732 B2 | 2/2012 | Hanrot | |
| 8,153,613 B2 | 4/2012 | Ahmed et al. | |
| 8,163,101 B2 | 4/2012 | Dooley et al. | |
| 8,178,484 B2 | 5/2012 | Schwarz et al. | |
| 8,268,337 B2 | 9/2012 | Wheeler | |
| 8,317,934 B2 | 11/2012 | Kholodenko et al. | |
| 8,343,523 B2 | 1/2013 | Toreki et al. | |
| 8,343,908 B2 | 1/2013 | Mundschau et al. | |
| 8,440,606 B2 | 5/2013 | Mundschau et al. | |
| 8,575,085 B2 | 11/2013 | Schwarz et al. | |
| 8,926,999 B2 | 1/2015 | Toreki et al. | |
| 9,237,831 B1 | 1/2016 | Luu et al. | |
| 2002/0119902 A1 | 8/2002 | Harrison et al. | |
| 2003/0114342 A1 | 6/2003 | Hall | |
| 2003/0143264 A1 | 7/2003 | Margiotta | |
| 2003/0147925 A1 | 8/2003 | Sawan et al. | |
| 2005/0003163 A1 | 1/2005 | Krishnan | |
| 2005/0008676 A1 | 1/2005 | Qiu et al. | |
| 2005/0042240 A1 | 2/2005 | Utterberg et al. | |
| 2006/0068024 A1 | 3/2006 | Schroeder et al. | |
| 2006/0193816 A1 | 8/2006 | Elfersy et al. | |
| 2006/0213801 A1 | 9/2006 | Karaoren et al. | |
| 2006/0269441 A1 | 11/2006 | Ochomogo et al. | |
| 2007/0166403 A1 | 7/2007 | McArdle | |
| 2007/0231291 A1 | 10/2007 | Huang et al. | |
| 2007/0254979 A1 | 11/2007 | Salz et al. | |
| 2008/0020127 A1 | 1/2008 | Whiteford et al. | |
| 2008/0026026 A1 | 1/2008 | Lu et al. | |
| 2008/0185332 A1 | 8/2008 | Niu et al. | |
| 2008/0197112 A1 | 8/2008 | Wang et al. | |
| 2008/0207581 A1 | 8/2008 | Whiteford et al. | |
| 2009/0087393 A1 | 4/2009 | Jensen et al. | |
| 2009/0181060 A1 | 7/2009 | Rosato et al. | |
| 2009/0194479 A1 | 8/2009 | Niu et al. | |
| 2009/0238948 A1 | 9/2009 | Muller et al. | |
| 2010/0015236 A1 | 1/2010 | Magdassi et al. | |
| 2010/0035997 A1 | 2/2010 | Broadley et al. | |
| 2010/0062966 A1 | 3/2010 | Lincoln et al. | |
| 2010/0197748 A1 | 8/2010 | Schwarz et al. | |
| 2010/0215643 A1 | 8/2010 | Clevenger et al. | |
| 2010/0216889 A1 | 8/2010 | Modak et al. | |
| 2010/0305064 A1 * | 12/2010 | Walsh | A61Q 19/00 514/60 |
| 2011/0065346 A1 | 3/2011 | Bender et al. | |
| 2011/0177146 A1 | 7/2011 | Cahill et al. | |
| 2011/0200655 A1 | 8/2011 | Black et al. | |
| 2012/0034287 A1 | 2/2012 | Napolitano et al. | |
| 2012/0045583 A1 | 2/2012 | Frenkel et al. | |
| 2012/0071525 A1 | 3/2012 | Schwarz et al. | |
| 2012/0148751 A1 | 6/2012 | Herdt et al. | |
| 2012/0178817 A1 | 7/2012 | Yin et al. | |
| 2012/0183606 A1 | 7/2012 | Bender et al. | |
| 2012/0213865 A1 | 8/2012 | McCullough et al. | |
| 2013/0101674 A1 | 4/2013 | Toft | |
| 2013/0138085 A1 | 5/2013 | Tennican | |
| 2013/0204212 A1 | 8/2013 | Tennican | |
| 2013/0280313 A1 | 10/2013 | Yoon et al. | |
| 2013/0281549 A1 | 10/2013 | Bonutti | |
| 2013/0323188 A1 | 12/2013 | Kabanov et al. | |
| 2014/0011766 A1 | 1/2014 | Krafft | |
| 2014/0080977 A1 | 3/2014 | Youngblood et al. | |
| 2014/0121230 A1 | 5/2014 | De Asis | |
| 2014/0170197 A1 | 6/2014 | Kabanov et al. | |
| 2014/0220331 A1 | 8/2014 | Lord et al. | |
| 2014/0314664 A1 | 10/2014 | Qin et al. | |
| 2014/0322285 A1 | 10/2014 | Bui et al. | |
| 2015/0017215 A1 | 1/2015 | Wahal et al. | |
| 2015/0190543 A1 | 7/2015 | Marshall et al. | |
| 2015/0284587 A1 * | 10/2015 | Schallenberger | C09D 167/04 523/122 |
| 2015/0307718 A1 | 10/2015 | Colak et al. | |
| 2016/0058008 A1 | 3/2016 | Cao et al. | |
| 2016/0143275 A1 | 5/2016 | Lan et al. | |
| 2016/0143276 A1 | 5/2016 | Lan et al. | |
| 2016/0262382 A1 | 9/2016 | Lan et al. | |
| 2016/0262383 A1 | 9/2016 | Lan et al. | |
| 2017/0280716 A1 | 10/2017 | Lan et al. | |

FOREIGN PATENT DOCUMENTS

| | | |
|---|---|---|
| CN | 1351647 A | 5/2002 |
| CN | 101473825 A | 7/2009 |
| CN | 101627092 | 1/2010 |
| CN | 101715784 A | 6/2010 |
| CN | 102215874 A | 10/2011 |
| CN | 102365584 A | 2/2012 |
| CN | 102481264 A | 5/2012 |
| CN | 102965214 A | 3/2013 |
| CN | 103161071 | 6/2013 |
| DE | 4118723 A1 | 1/1992 |
| EP | 0483426 A1 | 5/1992 |
| EP | 0290739 B1 | 2/1993 |
| EP | 0290676 B1 | 8/1994 |
| EP | 0431739 B1 | 12/1998 |
| EP | 1100858 A1 | 5/2001 |
| EP | 1104449 A1 | 6/2001 |
| EP | 0935646 B1 | 5/2003 |
| EP | 1179039 B2 | 4/2004 |
| EP | 1111995 B1 | 2/2005 |
| EP | 1054596 B1 | 4/2009 |
| EP | 2170919 A2 | 4/2010 |
| EP | 2459659 B1 | 7/2013 |
| FR | 2994095 A1 | 2/2014 |
| GB | 1195796 | 6/1970 |
| GB | 1553132 | 9/1979 |
| GB | 2339795 B | 6/2000 |
| GB | 2318585 B | 9/2000 |
| GB | 2340503 B | 10/2000 |
| GB | 2353043 A | 2/2001 |
| GB | 2340501 B | 7/2002 |
| GB | 2407581 A | 5/2005 |
| JP | 55-120627 | 9/1980 |
| JP | 04-041599 A | 2/1992 |
| JP | H0776113 B2 | 8/1995 |
| JP | 2005154965 A | 6/2005 |
| JP | 2005516809 A | 6/2005 |
| RU | 2329286 C1 | 7/2008 |
| RU | 2010146005 A | 5/2012 |
| RU | 2523714 C2 | 7/2014 |
| WO | WO 1991015186 A1 | 10/1991 |
| WO | WO 1995021602 A1 | 8/1995 |
| WO | WO 1998029085 A1 | 7/1998 |
| WO | WO 1998055096 A1 | 12/1998 |
| WO | WO 1999029173 A1 | 6/1999 |
| WO | WO 2000005330 A1 | 2/2000 |
| WO | WO 2000009640 A1 | 2/2000 |
| WO | WO 2003066791 A1 | 8/2003 |
| WO | WO 2006036909 A1 | 4/2006 |
| WO | WO 2006086271 A2 | 8/2006 |
| WO | WO 2007070801 A2 | 6/2007 |
| WO | WO 2007100653 A2 | 9/2007 |
| WO | WO 2007101445 A1 | 9/2007 |
| WO | WO 2007140267 A1 | 12/2007 |
| WO | WO 2008049616 A1 | 5/2008 |
| WO | WO 2008100993 A1 | 8/2008 |
| WO | WO 2008127416 A2 | 10/2008 |

(56) References Cited

FOREIGN PATENT DOCUMENTS

| WO | WO 2008137381 A1 | 11/2008 |
|---|---|---|
| WO | WO 2008154395 A1 | 12/2008 |
| WO | WO 2009010749 A2 | 1/2009 |
| WO | WO 2009010749 A3 | 1/2009 |
| WO | WO 2009089346 A2 | 7/2009 |
| WO | WO 2010080652 A1 | 7/2010 |
| WO | WO 2010144503 A4 | 12/2010 |
| WO | WO 2011064554 A1 | 6/2011 |
| WO | WO 2011148160 A1 | 12/2011 |
| WO | WO 2012146917 A1 | 11/2012 |
| WO | WO 2012149591 A1 | 11/2012 |
| WO | WO 2013052454 A1 | 4/2013 |
| WO | WO 2013082187 A1 | 6/2013 |
| WO | WO 2013102021 A2 | 7/2013 |
| WO | WO 2013173742 A1 | 11/2013 |
| WO | 2014099465 A1 | 6/2014 |
| WO | WO 2014100778 A1 | 6/2014 |
| WO | WO 2014143705 A1 | 9/2014 |
| WO | WO 2015078496 A1 | 6/2015 |
| WO | WO 2016086012 A1 | 6/2016 |
| WO | WO 2016086014 A1 | 6/2016 |
| WO | WO 2017091250 A1 | 6/2017 |
| WO | WO 2017091251 A1 | 6/2017 |
| WO | WO 2017205244 A1 | 11/2017 |
| WO | WO 2017205328 A1 | 11/2017 |

OTHER PUBLICATIONS

Nuview, Continu Surface Cleaner and Disinfectant, Continu 2 in 1 Cleaner & Disinfectant, http://voroscopes.co.uk/continu/surface-disinfectant/, accessed Oct. 17, 2016, all enclosed pages cited.

Difference between Corrosion and Rusting: retrieved from internet: http://www.differencebetween.com/difference-between-corrosion-and-vs-rusting/, retrieved Mar. 29, 2017.

Waschinski et al., "insights In the Antibacterial Action of Poly(methyloxazoline)s with a Biocidal End Group and Varying Satellite Groups", Biomacromolecules 2008, vol. 9, pp. 1764-1771, abstract, p. 1766, Scheme 1, p. 1767, Table 1.

Waschinski C J et al., "Poly(oxazoline)s with Telechelic Antimicrobial Functions", Biomacromolecules, American Chemical Society, vol. 6, Jan. 1, 2005, p. 235-243.

Ferreira, C., et al., Physiological changes induced by the quaternary ammonium compound benzyldimethyldodecylammonium choloride on Pseudomonas fluorescens, Journal of Antimicrobial Chemotherapy, p. 1036-1043, Feb. 8, 2011, Oxford.

Ioannou, C.J., et al., Action of Disinfectant Quaternary Ammonium Compounds against *Staphylococcus aureus,* Antimicrobial Agents and Chemotherapy, American Society for Microbiology, 2007, p. 296-306.

Knol, M.J., et al., Estimating measures of interaction on an additive scale for preventive exposures, European Journal of Epidemiology, 2011, 26(6): p. 433-438.

SRLChem (http://www.srlchem.com/brochures/SRL%20Analytical%20Solvents,%20Ion%20Pairing%20reagents%20and%20Quartnery%20Ammonium%20Compounds%202016-17.pdf).

Siedenbiedl, F, et al., Antimicrobial Polymers in Solution and on Surfaces: Overview and Functional Principles. Polymers. Jan. 9, 2012, vol. 4, pp. 46-71, p. 52, Third Paragraph; p. 55; First Paragraph to Second Paragraph; p. 55, Figure 7, Figure.

Aquazol 500 MSDS, Jan. 11, 2016, Retrieved from the internet, Retrieved from https:shop.kremerpigments.com/media/pdf/63905_MSDS.pdf.

Promulgen D—Lubrizol: retrieved from internet: https://www.lubrizol.com/-/media/Lubrizol/Life-Sciences/.../TDS/Promulgen-D.pdf. Retrieved on Nov. 7, 2018.

Konradi, Rupert et al. "Polyoxazolines for Nonfouling Surface Coatings—A Direct Comparison to the Gold Standard PEG," Macromolecular Rapid Communications, vol. 33, No. 19, Oct. 15, 2012, pp. 1663-1676.

* cited by examiner

TOUCH SCREEN CLEANING AND PROTECTANT COMPOSITION

CROSS-REFERENCE TO RELATED APPLICATION

The present application claims priority from U.S. provisional patent application 62/340,310, filed on May 23, 2016, incorporated by reference herein in its entirety.

FIELD OF THE INVENTION

The present invention relates to a cleaning and protectant composition, more particularly to a cleaning and protectant composition suitable for use on a touch screen or screen protector of a mobile device, computer, or other electronic device.

BACKGROUND OF THE INVENTION

The number of mobile devices, computers, and other devices having touch screens has exploded. These screens can have lots of bacteria and germs from repeated use and touch without cleaning. Cleaning products to date that are available for this purpose are typically general glass cleaners. Most of these glass cleaners are alcohol-based liquid products. Such products are only limited to cleaning dirt or contamination off of a screen surface without leaving a protection film. A touch screen can be re-contaminated quickly and has to be cleaned frequently to keep it clean.

Other polymer and water-based products suffer from a number of problems including, but not limited to, reduction of the transparency and clearness of the screen, a short-life cycle before reapplication, product build-up on the screen negatively affecting transparency, and difficulty in removal.

Thus, there is a need for a product that overcomes the problems set forth above and is suitable for use on a touch screen or screen protector or on other articles where such problems are also of concern.

SUMMARY OF THE INVENTION

The present invention relates to a cleaning and protectant composition suitable for use on an article such as a touch screen or screen protector for a mobile device, computer, or other device.

The present invention also relates to a cleaning and protectant composition suitable for use on an article such as a clear plastic substrate or coating material such as food wrap.

In an embodiment of the invention, the composition comprises a carrier and a polymeric film former, wherein the polymeric film former is an oxazoline homopolymer or an extended or a modified polymer based on an oxazoline homopolymer.

In an embodiment of the invention, the polymeric film former forms a retention coating to retain components within the composition for an extended period of time.

In an embodiment of the invention, an article is provided. The article comprises a surface having been treated with a composition comprised of a carrier and a polymeric film former, wherein the polymeric film former is an oxazoline homopolymer or an extended or a modified polymer based on an oxazoline homopolymer. The article is, for example, a touch screen, a screen protector, a wipe, food wrap, among others.

In an embodiment of the invention, a method of using a composition is provided. The method comprises obtaining a composition comprised of a carrier and a polymeric film former, wherein the polymeric film former is an oxazoline homopolymer or an extended or a modified polymer based on an oxazoline homopolymer; and applying the composition to an article.

In an embodiment of the invention, a kit is provided. The kit comprises an application device and a composition comprised of a carrier and a polymeric film former, wherein the polymeric film former is an oxazoline homopolymer or an extended or a modified polymer based on an oxazoline homopolymer. The application device is used to apply the composition to the article, for example, to the touch screen or screen protector.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DESCRIPTION OF THE PREFERRED EMBODIMENTS

The following description of the embodiments of the present invention is merely exemplary in nature and is in no way intended to limit the invention, its application, or uses. The present invention has broad potential application and utility, which is contemplated to be adaptable across a wide range of industries. The following description is provided herein solely by way of example for purposes of providing an enabling disclosure of the invention, but does not limit the scope or substance of the invention.

As used herein, the terms "microbe" or "microbial" should be interpreted to refer to any of the microscopic organisms studied by microbiologists or found in the use environment of a treated article. Such organisms include, but are not limited to, bacteria and fungi as well as other single-celled organisms such as mold, mildew and algae. Viral particles and other infectious agents are also included in the term microbe.

"Antimicrobial" further should be understood to encompass both microbicidal and microbistatic properties. That is, the term comprehends microbe killing, leading to a reduction in number of microbes, as well as a retarding effect of microbial growth, wherein numbers may remain more or less constant (but nonetheless allowing for slight increase/decrease).

For ease of discussion, this description uses the term antimicrobial to denote a broad spectrum activity (e.g. against bacteria and fungi). When speaking of efficacy against a particular microorganism or taxonomic rank, the more focused term will be used (e.g. antifungal to denote efficacy against fungal growth in particular).

Using the above example, it should be understood that efficacy against fungi does not in any way preclude the possibility that the same antimicrobial composition may demonstrate efficacy against another class of microbes.

For example, discussion of the strong bacterial efficacy demonstrated by a disclosed embodiment should not be read to exclude that embodiment from also demonstrating antifungal activity. This method of presentation should not be interpreted as limiting the scope of the invention in any way.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

In an embodiment of the invention, a composition is provided that is suitable for use as a cleaner and a protectant on an article. Examples of articles include, but are not limited to, a touch screen and/or screen protector of a mobile device, computer, or other electronic device, a wipe, food wrap, a plastic substrate, and a plastic coating.

The composition comprises a polymeric film former. In a preferred embodiment of the invention, the polymeric film former forms a retention coating to retain components within the composition for an extended period of time. Examples of such components include, but are not limited to, colorants, dyes, pigments, fragrance, biocidal agents, and other components.

In an embodiment of the invention, the polymeric film former is an oxazoline homopolymer. As another feature of the invention, the oxazoline homopolymer has the following structure:

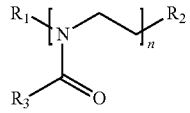

wherein $R_1$ and $R_2$ are end groups determined by the polymerization techniques used to synthesize oxazoline homopolymer. $R_1$ and $R_2$ are independently selected and include, but are not limited to, hydrogen, alkyl, alkenyl, alkoxy, alkylamino, alkynyl, allyl, amino, anilino, aryl, benzyl, carboxyl, carboxyalkyl, carboxyalkenyl, cyano, glycosyl, halo, hydroxyl, oxazolinium mesylate, oxazolinium tosylate, oxazolinium triflate, silyl oxazolinium, phenolic, polyalkoxy, quaternary ammonium, thiol, or thioether groups. Alternatively, $R_2$ could include a macrocyclic structure formed during synthesis as a consequence of intramolecular attack.

For example, $R_1$ is a methyl group and $R_2$ is oxazolinium tosylate if methyl tosylate is used as the initiator in the cationic initiated polymerization of oxazoline.

$R_3$ is an end group determined by the type of oxazoline used in the preparation of the polymeric film former of this invention. $R_3$ includes, but is not limited to, hydrogen, alkyl, alkenyl, alkoxy, aryl, benzyl, hydroxyalkyl, or perfluoroalkyl. For example, $R_3$ is an ethyl group if ethyloxazoline is the monomer used to prepare the polymeric film former for the present invention.

n is the degree of oxazoline polymerization in the homopolymer. n is in a range of 1 to 1,000,000. Preferably, n is in a range of 500 to 250,000; most preferably, n is in a range of 2500 to 100,000.

Similar to oxazoline homopolymer, extended or modified polymers with some variations based on the oxazoline homopolymer are also suitable for the present invention. The techniques and options for performing chemical or molecular structure variations or modifications to oxazoline should be familiar to those skilled in the art. A class of extended or modified polymers based on oxazoline homopolymer can be represented with the following molecular structure:

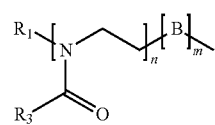

wherein

B is additional monomer repeating unit linked to oxazoline in a copolymer. The types of arrangement of the repeating units between B and oxazoline in the copolymer can include, but are not limited to, block, alternating, periodic, or combinations thereof. There is no limitation as to the types of B that can be used to copolymerize with or modify the oxazoline of the present invention.

n is the degree of polymerization for an oxazoline repeating unit; n in the copolymer is in a range of 1 to 1,000,000 and the degree of polymerization for B repeating unit in the copolymer m is in a range of 0 to 500,000 at the same time. Preferably, n is in a range of 500 to 250,000 and m is in a range of 20 to 10,000; and most preferably, n is in a range of 2500 to 100,000 and m is in a range of 50 to 5,000. In addition to linking B to ethyloxazoline through copolymerization, B could also be linked to oxazoline as an end group in a cationic polymerization by using B as a cationic initiator if B itself is already a quaternary ammonium compound.

Not intended to be all inclusive, B can be, for example, ethyleneimine with the following molecular structure:

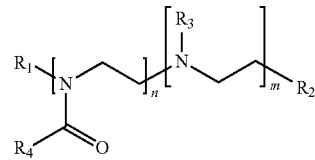

wherein $R_1$ and $R_2$ end groups have the same definition as those outlined for oxazoline homopolymer.

$R_3$ includes, but is not limited to, hydrogen, alkyl, alkenyl, alkoxy, aryl, benzyl, hydroxyalkyl, or perfluoroalkyl.

$R_4$ includes, but is not limited to, hydrogen, alkyl, alkenyl, alkoxy, aryl, benzyl, hydroxyalkyl, or perfluoroalkyl.

m is in a range of 0 to 500,000; preferably, in a range of 20 to 10,000; and most preferably, in a range of 50 to 5,000.

n is in a range of 1 to 1,000,000; preferably, 500 to 250,000; most preferably, in a range of 2500 to 100,000.

The synthesis of oxazoline and ethyleneimine copolymer can be phased into two steps, for example. In a first step, a cationic ring opening polymerization technique can be used to make polyoxazoline homopolymer. In a second step, the polyoxazoline made in the first step can be hydrolyzed to convert part of polyoxazoline repeating units into polyethyleneimine. Alternatively, oxazoline-ethylenimine copolymer can be made with the appropriate respective monomers, an oxazoline and an aziridine. The result would be a cationic polymer having the above structure.

The degree of polymerization for oxazoline repeating unit n in the copolymer is in a range of 1 to 1,000,000 and the degree of polymerization for ethyleneimine repeating unit in the copolymer m is in a range of 0 to 500,000 at the same time. Preferably, n is in a range of 500 to 250,000 and m is in a range of 20 to 10,000, and most preferably n is in a range of 2500 to 100,000 and m is in a range of 50 to 5,000.

Alternatively, the nitrogen in the ethyleneimine repeating unit could be further quaternized to generate the following cationic copolymer:

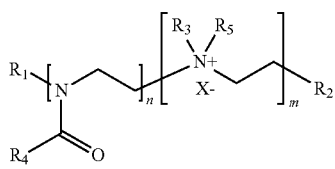

Any quaternization technique that is familiar to those skilled in the art could be used to quaternize the polymer of this example. $R_1$, $R_2$, $R_3$ and $R_4$ have the same meaning as those designated in the above oxazoline-ethyleneimine copolymer. $R_5$ includes, but is not limited to, a hydrogen, methyl, ethyl, propyl, or other types of alkyl group. The corresponding anion $X^-$ is a halogen, sulfonate, sulfate, phosphonate, phosphate, carbonate/bicarbonate, hydroxy, or carboxylate.

The ranges for n and m are also the same as those described in oxazoline-ethyleneimine copolymer.

Another example of B that can be used for the present invention is polydiallyldimethylammonium chloride. Polyethyloxazoline modified with polydiallyldimethylammonium chloride has the following structure:

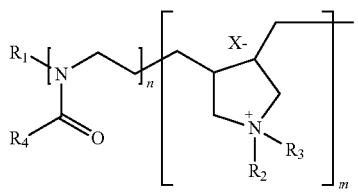

wherein $R_1$ and $R_4$ have the same meaning as described in previous example for quaternized oxazoline-ethyleneimine copolymer.

$R_2$ and $R_3$, independently, include, but are not limited to, short chain alkyl groups such as $C_1$ to $C_6$. The corresponding anion $X^-$ is a halogen, sulfonate, sulfate, phosphonate, phosphate, carbonate/bicarbonate, hydroxy, or carboxylate.

n and m are defined and numbered the same as in previous examples.

B could be other olefins including, but not limited to, diallyldimethylammonium chloride, styrene, methoxystyrene, and methoxyethene. Ethyloxazoline can also be copolymerized with heterocyclic monomers such as oxirane, thietane, 1,3-dioxepane, oxetan-2-one, and tetrahydrofuran to enhance the performance of the polymer for the present invention. The binder used in this invention could also employ pendant oxazoline groups on a polymer backbone, such as an acrylic or styrene based polymer, or a copolymer containing acrylic or styrene.B could be other olefins including, but not limited to, diallyldimethylammonium chloride, styrene, methoxystyrene, and methoxyethene. Ethyloxazoline can also be copolymerized with heterocyclic monomers such as oxirane, thietane, 1,3-dioxepane, oxetan-2-one, and tetrahydrofuran to enhance the performance of the polymer for the present invention. The binder used in this invention could also employ pendant oxazoline groups on a polymer backbone, such as an acrylic or styrene based polymer, or a copolymer containing acrylic or styrene.

Examples of commercially available polyethyloxazolines include, but are not limited to, Aquazol 500 from Polymer Chemistry Innovations, Inc.

In an embodiment of the invention, the composition optionally comprises a biocidal agent. A non-exhaustive list of biocidal compounds includes, but is not limited to, triclosan, zinc pyrithione, metal salts and oxides, phenols, botanicals, halogens, peroxides, heterocyclic antimicrobials, aldehydes, and alcohols.

In a preferred embodiment of the invention, the biocidal agent is a quaternary ammonium compound (QAC) with the following molecular structure:

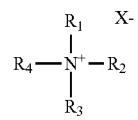

wherein $R_1$, $R_2$, $R_3$, and $R_4$ are independently selected and include, but are not limited to, alkyl, alkoxy, or aryl, either with or without heteroatoms, or saturated or non-saturated. Some or all of the functional groups may be the same.

The corresponding anion $X^-$ includes, but is not limited to, a halogen, sulfonate, sulfate, phosphonate, phosphate, carbonate/bicarbonate, hydroxy, or carboxylate.

QACs include, but are not limited to, n-alkyl dimethyl benzyl ammonium chloride, di-n-octyl dimethyl ammonium chloride, dodecyl dimethyl ammonium chloride, n-alkyl dimethyl benzyl ammonium saccharinate, and 3-(trimethoxysilyl) propyldimethyloctadecyl ammonium chloride.

Combinations of monomeric QACs are preferred to be used for the invention. A specific example of QAC combination is N-alkyl dimethyl benzyl ammonium chloride (40%); N-octyl decyl dimethyl ammonium chloride (30%); di-n-decyl dimethyl ammonium chloride (15%); and di-n-dioctyl dimethyl ammonium chloride (15%). The percentage is the weight percentage of individual QAC based on the total weight of blended QACs composition.

Polymeric version of the QACs with the following structures can also be used for the invention.

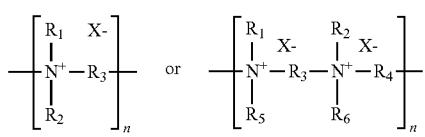

wherein $R_1$, $R_2$, $R_5$, and $R_6$, independently, include, but are not limited to, hydrogen, methyl, ethyl, propyl or other longer carbon alkyl groups.

$R_3$ and $R_4$ are independently selected and include, but are not limited to, methylene, ethylene, propylene or other longer alkylene linking groups.

n is the degree of polymerization; n is an integer in a range of from 2 to 10,000.

Examples of cationic polymers with the above structure, include but are not limited to, polyamines derived from dimethylamine and epichlorohydrin such as Superfloc C-572 commercially available from Kemira Chemicals.

Still another polymeric QAC suitable for the invention is poly diallyldimethylammonium chloride or polyDADMAC.

Yet another class of QACs useful for the present invention are those chemical compounds with biguanide moiety in the molecule. Examples of this class of cationic antimicrobials include, but are not limited to, PHMB and chlorhexidine.

Examples of commercially available quaternary ammonium compounds include, but are not limited to, Bardac 205M and 208M from Lonza, and BTC885 from Stepan Company.

The composition of the present invention not only provides an initial cleaning action but also leaves a protection film on an article such as a touch screen for continuous protection of the screen from re-contamination.

In an embodiment of the invention, the composition comprises a cleaning and soil resistant agent.

Optionally, the composition comprises a fragrance, a colorant, or a combination thereof. The fragrance, colorant, or combination thereof can be added to the composition for aesthetic appeal, for example.

The composition may further comprise other components including, but not limited to, a surfactant, a stain resistant agent, an oil and/or water repellant, and a carrier such as water or a solvent.

Examples of solvents include, but are not limited to, water and low molecular weight alcohols such as C1 to C8 alkanols. Specific examples include, but are not limited to, ethanol, isopropyl alcohol, butanol, pentanol, and combinations thereof.

Another class of solvents for use in the invention includes alkylene glycol ether. Examples include, but are not limited to, ethylene glycol monopropyl ether, ethylene glycol monobutyl ether, ethylene glycol monohexyl ether, ethylene clycol monohexyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, propylene glycol methyl ether, propylene glycol methyl ether acetate, propylene glycol n-butyl ether, dipropylene glycol n-butyl ether, dipropylene glycol methyl ether, dipropylene glycol methyl ether acetate, propylene glycol n-propyl ether, dipropylene glycol n-propyl ether, and tripropylene glycol methyl ether.

Another class of solvents for use in the invention is based on terpenes and their derivatives such as terpene alcohols, terpene esters, terpene ethers, or terpene aldehydes. Examples of solvents, include but are not limited to, pine oil, lemon oil, limonene, pinene, cymene, myrcene, fenchone, borneol, nopol, cineole, ionone and the like.

In an embodiment of the invention, the composition is in the form of a liquid. The liquid composition can be packaged and used in a spray bottle such as trigger spray or aerosol. In a spray application, the composition can be sprayed onto a contaminated or dirty screen and then wiped out clean and dry. As the result of such a cleaning action, the screen surface is cleaned and, subsequently, a clear dry film is deposited on the screen for continuous protection for an extended period of time.

In an embodiment, a wipe impregnated or otherwise treated with the liquid composition of the present invention can be used. The wipe having the liquid composition thereon can be used to wipe a contaminated surface such as a touch screen or screen protector (such as back and forth a couple of times) until the surface comes clean. After the wiping process, a film is automatically deposited onto the screen, and once it is dry, it provides continuous protection to the screen for an extended period of time.

The composition of the invention not only provides initial cleaning activity but also leaves a protection film on a screen immediately after cleaning. It keeps screen clean, sanitized, and pleasant for an extended period of time without frequent cleaning.

In an embodiment of the invention, a kit is provided. The kit comprises an application device and the composition described herein comprised of a carrier and a polymeric film former, wherein the polymeric film former is an oxazoline homopolymer or an extended or a modified polymer based on an oxazoline homopolymer. The application device is any device used to apply the composition to a surface of the touch screen or other article. The application device is preferably selected from the group consisting of a spray bottle, sponge, a wipe, and a combination thereof.

In an embodiment of the invention, a method of using is provided. The method comprises obtaining the composition described herein comprised of a carrier and a polymeric film former, wherein the polymeric film former is an oxazoline homopolymer or an extended or a modified polymer based on an oxazoline homopolymer; and applying the composition to an article. The composition may be applied with the application device.

Alternatively, the composition may be applied by other application techniques and methods including, but not limited to, industrial coating techniques. Examples of industrial coating techniques include, but are not limited to, slot coating, curtain coating, dip coating, roll coating, kiss coating, spray coating, and knife coating.

Among the benefits of the composition of the present invention are that it provides aesthetic enhancement, increases the useful life of a touch screen, does not affect the transparency of a touch screen, and is easily removable, among other benefits. The use of the polymeric film former creates a retention coating for coloration and aroma effects as well as provides finger print protection and protection from scratching.

Examples

The following examples illustrate liquid formulations made in accordance with various aspects of the present invention. The testing results on these formulations demonstrate the desired residual sanitizing or disinfecting performance once being applied onto surfaces and dried.

Formulations were tested for residual efficacy using the EPA 01-1A protocol. Briefly, bacteria were added to a glass slide and allowed to dry on the surface. The formulation was then sprayed onto the surface and dried to form a transparent film. Once a film had formed, the glass slide was exposed to alternating wet and dry cycles using the Gardner wear tester as described in the protocol. In between each cycle the slide was re-inoculated with bacteria. After the appropriate number of wear and re-inoculations (48 passes and 11 re-inoculations for healthcare formulation and 24 passes 5 re-inoculation for homecare formulation) the slide was exposed to bacteria for the indicated time frame (i.e. 5 minutes) followed by recovery in an appropriate neutralizing solution.

Examples

The following formulation in the example uses alcohol as the major carrier in order to provide fast drying property to the liquid formulations.

TABLE 1

| Components | HE1 (wt %) | HE2 (wt %) | HE3 (wt %) |
|---|---|---|---|
| Water | balance | balance | balance |
| Ethanol | 70 | 70 | 0 |
| 2-Propanol | 0 | 0 | 70 |
| Polyethyloxazoline | 2 | 2 | 2 |
| Quaternary ammonium compound | 0.8 | 1.2 | 1.2 |
| Wetting agent/Surfactant | 0.1 | 0.1 | 0.1 |

The residual efficacy testing was conducted using EP01-1A protocol and the results are listed in the following Table.

TABLE 2

| Formulation | EP01-1A (average log reduction bacterial) |
|---|---|
| HE1 | 3.53 |
| HE2 | 5.50 |
| HE3 | 4.50 |

These formulations show excellent residual efficacy result based on EP01-1A test.

The ASTM E 1153 test protocol was also followed to assess the initial biocidal property of HE2. Test results are presented in the following Table.

TABLE 3

| Initial Efficacy | Time 3 log reduction | Method Complete kill (<10 CFU/PFU) | Method |
|---|---|---|---|
| Bacterial | | | |
| Klebsiella pneumoniae | 30 seconds | 1 minute | ASTM E 1153 |
| Pseudomonas aerugniosa | 30 seconds | 30 seconds | ASTM E 1153 |
| Staphylococcus aureus | 30 seconds | 30 seconds | ASTM E 1153 |
| MRSA | 30 seconds | 30 seconds | ASTM E 1153 |
| VRE | 30 seconds | 30 seconds | ASTM E 1153 |
| Enterobacter aerogenes | 30 seconds | 30 seconds | ASTM E 1153 |
| Enterococcus faecalis | 30 seconds | 1 minute | ASTM E 1153 |
| Fungal | | | |
| Aspergillus niger | 1 minute | 5 minutes | ASTM E 1153 |
| Tricophyton mentagrophytes | 1 minute | 5 minutes | ASTM E 1153 |
| Viral | | | |
| H1N1 (envelope) | 30 seconds | 30 seconds | ASTM E 1053 |
| MS2 (Non-enveloped) | 30 seconds | 5 minutes | ASTM E 1053 |

TABLE 3-continued

| Residual Efficacy | Time frame of exposure | Log reduction | Method |
|---|---|---|---|
| Pseudomonas aerugniosa | 5 minutes | >3 | EPA 01-1A |
| Enterobacter aerogenes | 5 minutes | >3 | EPA 01-1A |
| Staphylococcus aureus | 5 minutes | >3 | EPA 01-1A |

These data clearly demonstrate that sample surfaces treated with the exemplary liquid formulation disclosed herein possess a demonstrable biocidal activity at the indicated time frame.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. An article comprising:
    a surface having been treated with a composition comprising:
    a polymeric film former, wherein the polymeric film former is an oxazoline homopolymer,
    a quaternary ammonium compound or a combination of quaternary ammonium compounds, and
    a carrier present in an amount of at least 70 weight percent,
    wherein the article is selected from the group consisting of a touch screen, screen protector, wipe, food wrap, plastic substrate, plastic coating, and a combination thereof.

2. The article according to claim 1, wherein the composition is in a form of a liquid.

3. The article according to claim 1, wherein the composition further comprises a cleaning and soil resistant agent.

4. The article according to claim 1, wherein the carrier is selected from the group consisting of water, low molecular weight alcohol, alkylene glycol ether, terpenes and their derivatives, other solvent, and a combination thereof.

5. A method of using a composition, the method comprising:
    obtaining a composition comprised of a polymeric film former, wherein the polymeric film former is an oxazoline homopolymer, a quaternary ammonium compound or a combination of quaternary ammonium compounds, and a carrier, the carrier being present in an amount of at least 70 weight percent; and
    applying the composition to an article,
    wherein the article is selected from the group consisting of a touch screen, screen protector, wipe, food wrap, plastic substrate, plastic coating, and a combination thereof.

6. The method of using according to claim 5, wherein the composition is in a form of a liquid.

7. The method of using according to claim 5, wherein the composition further comprises a cleaning and soil resistant agent.

8. The method of using according to claim 5, wherein the carrier is selected from the group consisting of water, low molecular weight alcohol, alkylene glycol ether, terpenes and their derivatives, other solvent, and a combination thereof.

9. The method of using according to claim 5, wherein the article is selected from the group consisting of a touch screen, screen protector, wipe, food wrap, plastic substrate, plastic coating, and a combination thereof.

\* \* \* \* \*